US012633198B2

(12) United States Patent
Blackwelder et al.

(10) Patent No.: US 12,633,198 B2

(45) Date of Patent: May 19, 2026

(54) NO ELEMENT OF CHANCE ELECTRONIC GAME SYSTEM AND METHOD

(71) Applicant: Grover Gaming, Inc., Greenville, NC (US)

(72) Inventors: Garrett Blackwelder, Greenville, NC (US); Kevin Morse, Greenville, NC (US); Timothy Smith, Greenville, NC (US); Jason Smith, Greenville, NC (US)

(73) Assignee: Grover Gaming, Inc., Greenville, NC (US)

( * ) Notice: Subject to any disclaimer, the term of this patent is extended or adjusted under 35 U.S.C. 154(b) by 51 days.

(21) Appl. No.: 17/866,255

(22) Filed: Jul. 15, 2022

(65) Prior Publication Data

US 2022/0351571 A1 Nov. 3, 2022

Related U.S. Application Data

(63) Continuation-in-part of application No. 16/776,597, filed on Jan. 30, 2020, which is a continuation of application No. 14/468,493, filed on Aug. 26, 2014, now abandoned.

(60) Provisional application No. 61/870,013, filed on Aug. 26, 2013.

(51) Int. Cl.
*G07F 17/00* (2006.01)
*G07F 17/32* (2006.01)

(52) U.S. Cl.
CPC .................................. *G07F 17/326* (2013.01)

(58) Field of Classification Search
CPC .................................................... G07G 17/323
See application file for complete search history.

(56) References Cited

U.S. PATENT DOCUMENTS

| | | | | |
|---|---|---|---|---|
| 5,531,441 A * | 7/1996 | Dabrowski | G07F 17/3293 | 463/13 |
| 7,736,223 B2 * | 6/2010 | Pace | G07F 17/3227 | 463/19 |
| 8,313,372 B2 * | 11/2012 | Naicker | G07F 17/32 | 463/16 |
| 8,480,466 B2 * | 7/2013 | Muir | G07F 17/3262 | 463/16 |
| 2005/0003883 A1 * | 1/2005 | Muir | G07F 17/32 | 463/16 |
| 2006/0116208 A1 * | 6/2006 | Chen | G07F 17/32 | 463/43 |
| 2006/0151952 A1 * | 7/2006 | Encinas | A63F 3/00157 | 273/292 |
| 2006/0273518 A1 * | 12/2006 | Aida | A63F 1/00 | 273/292 |
| 2007/0045958 A1 * | 3/2007 | Rader | G07F 17/32 | 273/274 |
| 2007/0060245 A1 * | 3/2007 | Veenker | G07F 17/34 | 463/16 |
| 2007/0135197 A1 * | 6/2007 | Moody | G07F 17/32 | 463/13 |
| 2008/0274798 A1 * | 11/2008 | Walker | G07F 17/3237 | 463/43 |

(Continued)

*Primary Examiner* — Paul A D'Agostino

(74) *Attorney, Agent, or Firm* — Dilworth & Barrese, LLP; Barbara B. Courtney, Esq.

(57) ABSTRACT

A game system and method for allowing a player to view a complete list of all upcoming outcomes of a game in the order to be awarded, before spending consideration to play the game.

7 Claims, 7 Drawing Sheets

(56) References Cited

U.S. PATENT DOCUMENTS

| | | | | |
|---|---|---|---|---|
| 2009/0318218 | A1* | 12/2009 | Homnik | G07F 17/34 463/20 |
| 2013/0012283 | A1* | 1/2013 | Thomas | G07F 17/323 463/16 |
| 2013/0053134 | A1* | 2/2013 | Johnson | G07F 17/326 463/25 |
| 2014/0004930 | A1* | 1/2014 | Cannon | G07F 17/3225 463/25 |
| 2014/0077457 | A1* | 3/2014 | Snow | G07F 17/3223 273/292 |
| 2014/0206424 | A1* | 7/2014 | Taylor | G07F 17/3293 463/13 |
| 2015/0057065 | A1* | 2/2015 | Blackwelder | G07F 17/326 463/16 |
| 2017/0228966 | A1* | 8/2017 | Irwin, Jr. | G07F 17/3258 |
| 2018/0253929 | A1* | 9/2018 | Yee | G07F 17/3293 |
| 2021/0027581 | A1* | 1/2021 | Calapp | G07F 17/3213 |
| 2021/0373676 | A1* | 12/2021 | Jorasch | G06F 3/0383 |
| 2022/0329909 | A1* | 10/2022 | Ramirez Juan | G06F 3/0482 |
| 2022/0351571 | A1* | 11/2022 | Blackwelder | G07F 17/326 |
| 2023/0394916 | A1* | 12/2023 | Cardno | G07F 17/3293 |

* cited by examiner

300

| GAME NUMBER | INITIAL POOL | AFTER 6 PLAYS | AFTER 11 PLAYS | |
|---|---|---|---|---|
| 1 | 0 | 2 | 2 | |
| 2 | 0 | 0 | 0 | |
| 3 | 1 | 0 | 0 | 302 |
| 4 | 0 | 1 | 1 | |
| 5 | 2 | 0 | 0 | |
| 6 | 0 | 0 | 0 | |
| 7 | 4 | 4 | 3 | |
| 8 | 0 | 0 | 0 | 304 |
| 9 | 0 | 0 | 4 | |
| 10 | 3 | 3 | 0 | |
| 11 | 0 | 0 | 0 | |
| 12 | 0 | 0 | 0 | |
| 13 | 1 | 1 | 1 | |
| 14 | 1 | 1 | 1 | |
| 15 | 0 | 0 | 0 | |
| 16 | 2 | 2 | 2 | |
| 17 | 0 | 0 | 0 | |
| 18 | 0 | 0 | 0 | |
| 19 | 1 | 1 | 1 | |
| 20 | 2 | 2 | 2 | |
| 21 | 0 | 0 | 0 | |
| 22 | 0 | 0 | 0 | |
| 23 | 0 | 0 | 0 | |
| 24 | 4 | 4 | 4 | |
| 25 | 0 | 0 | 0 | |

*FIG. 6*

NO ELEMENT OF CHANCE ELECTRONIC GAME SYSTEM AND METHOD

CROSS REFERENCE TO RELATED APPLICATIONS

This application is a continuation-in-part of U.S. application Ser. No. 16/776,957, filed Jan. 30, 2020, the application of which is a continuation of U.S. application Ser. No. 14/468,493, filed Aug. 26, 2014, the application of which claims priority and is related to U.S. Provisional Application No. 61/870,013, filed Aug. 26, 2013, the entire disclosures of which are incorporated herein by reference.

BACKGROUND

In typical games of chance, a player is required to spend some form of consideration prior to the start of a game play and the player has no prior knowledge of what the result of the next game play will be. Only one, final result will be presented to the player after the player's consideration has been spent. No matter how the final result of a game play is generated, the player is chancing their consideration against a result that is not known to them prior to the play. Therefore, they are taking a chance on the outcome of the game.

Courts have held that, in general, to be considered a gambling device, a system must contain three elements, including prize, chance, and consideration. If one of those three elements is removed, the device or system does not constitute gambling. There are multi-billion dollar industries which have created game systems that have the look and feel of gambling but are not technically gambling because one of the above-listed elements has been removed. Social casino type gaming is one such industry. In social casino type games popular on Facebook and elsewhere, the player pays consideration for the chance to win more tokens, for example, to continue play. The user cannot however win a prize or anything of value. The element of "prize" has been removed and it is therefore not gambling. In the case of promotional sweepstakes games, a player is allowed to participate for free, through an alternative means of entry not accompanying a purchase, in a game where the user can win valuable prizes determined by chance. The element of "consideration" has been removed, and it is therefore not gambling.

Attempts have been made before to develop gaming machines without the element of "chance" but with the look and feel of traditional slot machines, video poker machines, and other similar gaming devices that do have an element of chance. In one example, such as that disclosed in U.S. patent publication no. 2013/0053134, a gaming machine system and method is disclosed that allows a potential player to view the next upcoming outcome of a game before playing it. The gaming system of the 2013/0053134 application requires the use of a random number generator in the generation of the outcome of the next game play, therefore, while it is able to display the next outcome of a game play it is not able to show any outcomes after that before the play of the game, or alternatively all the outcomes of the game in the order to be awarded before the play of the game. Rather, at each play the game, using the random number generator, generates a single outcome and then allows the player to view the outcome prior to the actual play. With such a gaming system, the player is taking some element of chance, not necessarily on the next outcome, but on the one after that, i.e., the outcomes are randomly generated one at a time immediately prior to the next play. As these types of gaming systems have at least some element of chance, in the past similar gaming systems have been found to be a gambling device as defined by some states.

Therefore, there is a need for an electronic game system that is not a "gambling device", but has the look and feel of traditional gaming systems, such as slot machines, video poker machines, and the like but with the element of chance removed (i.e., a player pays to play the game with the possibility of winning money, but not by chance).

SUMMARY

In one embodiment, an electronic game system for allowing a potential player to view all upcoming outcomes of a game in the order to be awarded, before spending consideration to play the game(s) is provided. The electronic game system may include, one or more electronic game machines configured to one of display or cause to be displayed a view of all the upcoming outcomes of the game in the order to be awarded prior to play, wherein the upcoming outcomes of the game are not generated using an element or instrument of chance, such as a random number generator or a pseudo-random number generator. The game may have one or more levels of play. The electronic game machine may be configured to one of display or cause to be displayed a view of all the outcomes of multiple levels of play of the game in the order to be awarded. The one or more electronic game machines may be configured to play games comprising one or more of slots, video poker, keno, and black jack. The electronic game system may include a single electronic game machine or a network of a plurality of electronic game machines. The electronic game machine may be further configured to one of display or cause to be displayed a view of an outcome of a next upcoming game. The outcome of the next upcoming game may be viewed on a next outcome window of a display of the electronic game machine. The view of the outcome of the next upcoming game may include an outcome value. The view of the outcome of the next upcoming game may include an outcome board display. The view of the outcome of the next upcoming game may include an outcome value and an outcome board display. The view of all upcoming outcomes of the game in the order to be awarded maybe viewed on an "all outcomes" window of a display of the electronic game machine. The view of the outcomes of all upcoming outcomes of the game in the order to be awarded may include outcome values. The view of the outcomes of all upcoming outcomes of the game in the order to be awarded may include outcome board displays. The view of the outcomes of all upcoming outcomes of the game in the order to be awarded may include outcome values and outcome board displays. The view of all upcoming outcomes of the game in the order to be awarded may be viewed in the form of a list. The view of all upcoming outcomes of the game in the order to be awarded may be generated from a predefined, finite list of outcomes. The view of all upcoming outcomes of the game in the order to be awarded may be viewed on a device remote from the electronic game machine. The view of all upcoming outcomes of the game in the order to be awarded may be viewed on a printout. The outcome of the next upcoming game may be viewed on a device remote from the electronic game machine. The outcome of the next upcoming game may be viewed on a printout.

In another embodiment, a method for allowing a potential player to view all upcoming outcomes of a game in the order to be awarded, before spending consideration to play the game is provided. The method may include accessing an electronic game configured to one of display or cause to be displayed a view of all the outcomes of the game in the order to be awarded prior to play; viewing all the outcomes of the game in the order to be awarded prior to play; determining whether or not to play the game based on viewing the outcomes prior to play, wherein the upcoming outcomes of the game are not generated using an element or instrument of chance, such as a random number generator or a pseudo-random number generator.

The method may further include placing a consideration deposit with the game prior to or after viewing all the outcomes of the game in the order to be awarded. The method may further include returning the deposited consideration in the event the potential player decides not to play based on viewing the outcomes prior to play. The game may include one or more levels of play. The electronic game machine may be configured to one of display or cause to be displayed a view of all the outcomes of multiple levels of play of the game in the order to be awarded. The method may further include selecting which of the multiple levels of play to play if deciding to play the upcoming game.

The method may further include authorizing a deduction from a consideration deposit corresponding to the selected levels of play. The method may further include obtaining a refund of a consideration deposit if none of the plurality of levels of play were selected. The electronic game machine may be configured to one of display or cause to be displayed a view of the outcome of the next upcoming game. The outcome of the next upcoming game may be displayed in a next outcome window of a display of the electronic game machine. The view of the outcome of the next upcoming game may include an outcome value. The view of the outcome of the next upcoming game may include an outcome board display. The view of the outcome of the next upcoming game may include an outcome value and an outcome board display. The view of the outcomes of all upcoming outcomes of the game in the order to be awarded may include outcome values. The view of the outcomes of all upcoming outcomes of the game in the order to be awarded may include outcome board displays. The view of the outcomes of all upcoming outcomes of the game in the order to be awarded may include outcome values and outcome board displays. The view of all the upcoming outcomes of the game in the order to be awarded may be displayed in an "all outcomes" window of a display of the electronic game machine. The view of all the upcoming outcomes of the game in the order to be awarded may be viewed in the form of a list. The view of all the upcoming outcomes of the game in the order to be awarded may be generated from a predefined, finite list of outcomes. The consideration deposited may include a monetary deposit. The view of all upcoming outcomes of the game in the order to be awarded may be viewed on a device remote from the electronic game machine. The view of all upcoming outcomes of the game in the order to be awarded may be viewed on a printout. The outcome of the next upcoming game may be viewed on a device remote from the electronic game machine. The outcome of the next upcoming game may be viewed on a printout.

In yet another embodiment, an electronic game system for allowing a potential player to view a plurality of upcoming outcomes of a game in the order to be awarded, before spending consideration to play the game(s) is provided. The electronic game system may include, one or more electronic game machines configured to one of display or cause to be displayed a view of all the upcoming outcomes of the game in the order to be awarded prior to play, wherein the upcoming outcomes of the game are not generated using an element or instrument of chance.

In still yet another embodiment, a method for allowing a potential player to view a plurality of upcoming outcomes of a game in the order to be awarded, before spending consideration to play the game is provided. The method may include accessing an electronic game configured to one of display or cause to be displayed a view of all the outcomes of the game in the order to be awarded prior to play; viewing all the outcomes of the game in the order to be awarded prior to play; determining whether or not to play the game based on viewing the outcomes prior to play, wherein the upcoming outcomes of the game are not generated using an element or instrument of chance.

In still yet another embodiment, a gaming system for providing a game to a player with no element of chance is provided. The gaming system may include a game machine including one or more games playable on the game machine; a display associated with the game machine; a player interface associated with the game machine, wherein the player interface is operable to receive a player selection, and wherein the player interface may include one or more player selectable fields; a consideration input associated with the game machine, wherein the consideration input may be operable to receive a consideration deposit; a database associated with the game machine, wherein the database may include an outcome table stored thereon, the outcome table may include a finite predefined list of each and every game outcome for each game play of the one or more games playable on the game machine, wherein the game outcome may be the full game outcome, and wherein the outcome table lists each and every one of the game outcomes in an exact order to be awarded by the game machine; a game controller including a processor associated with the game machine, display, consideration input, player interface, and database. The processor may be programmed to perform operations including generating a game board graphic on the display associated with a game to be played on the game machine; generating a view all outcomes player selectable field on the display; receiving a first command initiated by a player through the player interface, wherein the first command may include the player selecting to view or not view the full outcome table; if the first command initiated by the player is to view the outcome table via the generated view all outcomes player selectable field, generating an all outcomes window on the display including a viewable version of the full outcome table including each and every outcome for all upcoming game plays of the game and in the exact order to be awarded by the game machine; and receiving a second command initiated by the player through the player interface, wherein the second command may include the player selecting to play or not play the game associated with the generated game board; and wherein the processor is further programmed to, upon selection by the player to play the game, to automatically query the outcome table stored on the database for the game outcome next in sequential order and to display a game play result graphic that coincides with that game outcome. The processor may be further programmed to, at set intervals, automatically shuffle the order of a predetermined number of outcomes of previous game plays. The set intervals may be a predetermined number of game plays. The set intervals may be every X number of game plays, and wherein X may be a number that is a sub-set of the total number of game outcomes listed in the outcome table. Only the order of the predetermined number of outcomes of the previous game plays immediately preceding the set intervals are shuffled. The shuffled order of a first group of the predetermined number of outcomes shuffled at a first interval remains the same when a second group of the predetermined number of outcomes is shuffled at a second interval, and wherein the order of upcoming outcomes of the finite predefined list of outcomes remains the same.

In still yet another embodiment, a method for allowing a potential player to view all upcoming outcomes of a game in the order to be awarded, before spending consideration to play the game is provided. The method may include providing a game system for providing a game to a player with no element of chance. The game system may include a game machine including one or more games playable on the game machine; a display associated with the game machine; a player interface associated with the game machine, wherein the player interface is operable to receive a player selection, and wherein the player interface includes one or more player selectable fields; a consideration input associated with the game machine, wherein the consideration input may be operable to receive a consideration deposit; a database associated with the game machine, wherein the database may include an outcome table stored thereon, the outcome table may include a finite predefined list of each and every game outcome for each game play of the one or more games playable on the game machine, wherein the game outcome is the full game outcome, and wherein the outcome table lists each and every one of the game outcomes in an exact order to be awarded by the game machine; a game controller including a processor associated with the game machine, display, consideration input, player interface, and database. The processor may be programmed to perform operations including generating a game board graphic on the display associated with a game to be played on the game machine; generating a view all outcomes player selectable field on the display; receiving a first command initiated by a player through the player interface, wherein the first command may include the player selecting to view or not view the full outcome table; if the first command initiated by the player is to view the full outcome table via the generated view all outcomes player selectable field, generating an all outcomes window on the display including a viewable version of the full outcome table including each and every outcome for all upcoming game plays of the game in full and in the exact order to be awarded by the game machine; and receiving a second command initiated by the player through the player interface, wherein the second command may include the player selecting to play or not play the game associated with the generated game board; and wherein the processor may be further programmed to, upon selection by the player to play the game, to automatically query the outcome table stored on the database for the game outcome next in sequential order and to display a game play result graphic that coincides with that game outcome. The method may further include enabling the player to view the full outcome table including each and every outcome for all upcoming game plays of the game in full and in the exact order to be awarded by the game machine prior to game play; and allowing the player to play or not play the game after the complete outcome table is made viewable to the player. The processor may be further programmed to, at set intervals, automatically shuffle the order of a predetermined number of outcomes of previous game plays. The set intervals may be a predetermined number of game plays. The set intervals may be every X number of game plays, and wherein X is a number that is a sub-set of the total number of game outcomes listed in the outcome table. Only the order of the predetermined number of outcomes of the previous game plays immediately preceding the set intervals may be shuffled. The shuffled order of a first group of the predetermined number of outcomes shuffled at a first interval may remain the same when a second group of the predetermined number of outcomes is shuffled at a second interval, and wherein the order of upcoming outcomes of the finite predefined list of outcomes may remain the same.

In still yet another embodiment, a system is provided. The system may include a database associated with a game machine, wherein the database may include an outcome table stored thereon, the outcome table may include a finite predefined list of each and every game outcome for each game play of one or more games playable on the game machine, wherein the game outcome may be the full game outcome, and wherein the outcome table may list each and every one of the game outcomes in an exact order to be awarded by the game machine; a game controller that may include a processor associated with the game machine and database. The processor may be programmed to perform operations that may include generating a game board graphic on a display associated with the game to be played on the game machine; generating a view all outcomes player selectable field on the display; receiving a first command initiated by a player through a player interface, wherein the first command may include the player selecting to view or not view the outcome table; if the first command initiated by the player is to view the full outcome table via the generated view all outcomes player selectable field, generating an all outcomes window on the display including a viewable version of the full outcome table that may include each and every outcome for all upcoming game plays of the game in full and in the exact order to be awarded by the game machine; and receiving a second command initiated by the player through the player interface, wherein the second command may include the player selecting to play or not play the game associated with the generated game board; and wherein the processor may be further programmed to, upon selection by the player to play the game, to automatically query the outcome table stored on the database for the game outcome next in sequential order and to display a game play result graphic that coincides with that game outcome. The processor may be further programmed to, at set intervals, automatically shuffle the order of a predetermined number of outcomes of previous game plays. The set intervals may be a predetermined number of game plays. The set intervals may include every X number of game plays, and wherein X may be a number that is a sub-set of the total number of game outcomes listed in the outcome table. Only the order of the predetermined number of outcomes of the previous game plays immediately preceding the set intervals are shuffled. The shuffled order of a first group of the predetermined number of outcomes shuffled at a first interval may remain the same when a second group of the predetermined number of outcomes is shuffled at a second interval, and wherein the order of upcoming outcomes of the finite predefined list of outcomes may remain the same.

BRIEF DESCRIPTION OF THE DRAWINGS

Figure 1:
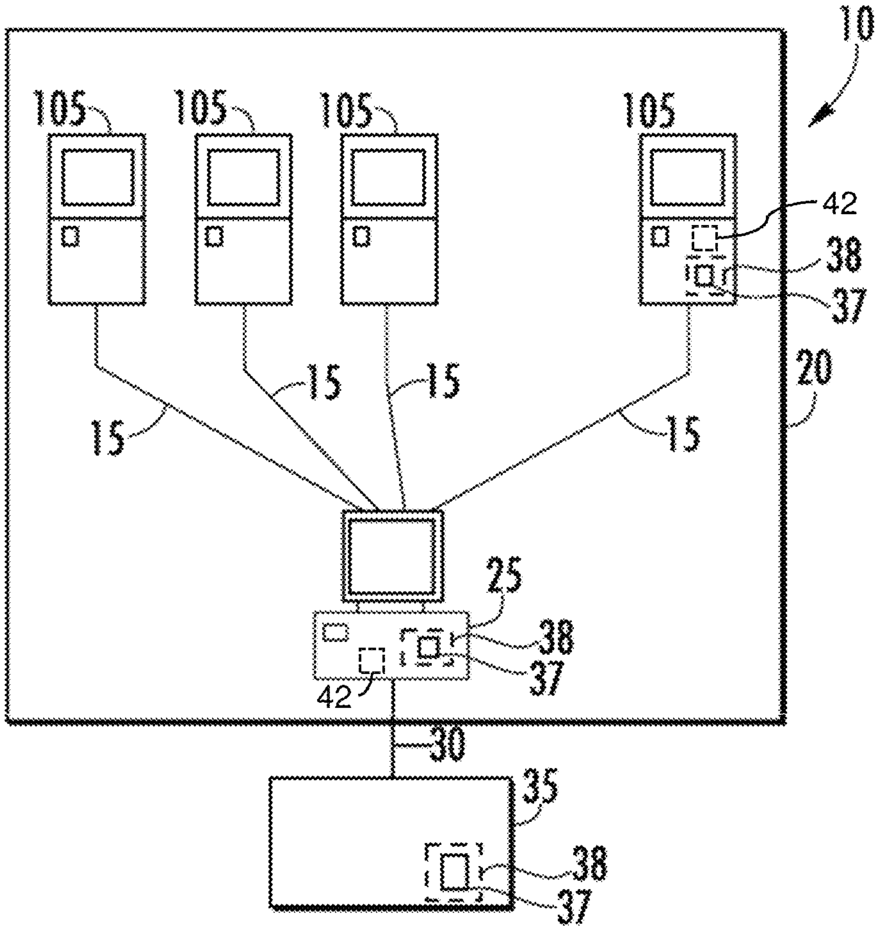
Figure 2:
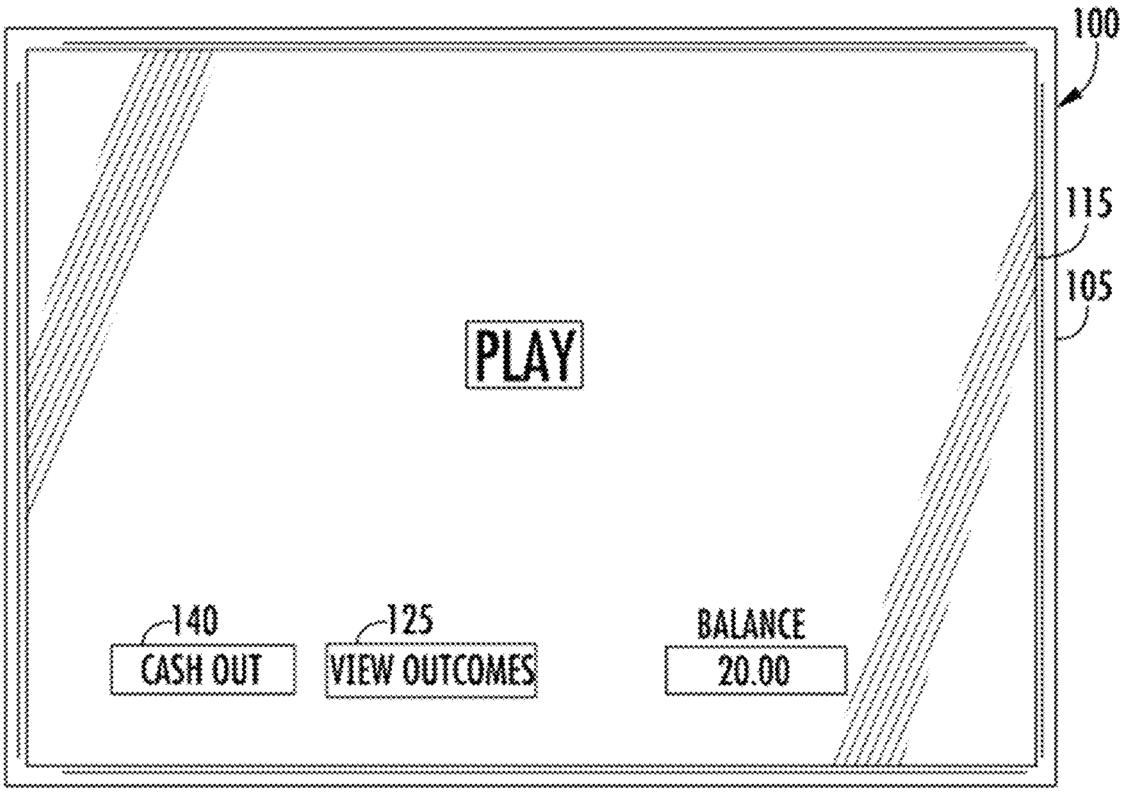
Figure 3A:
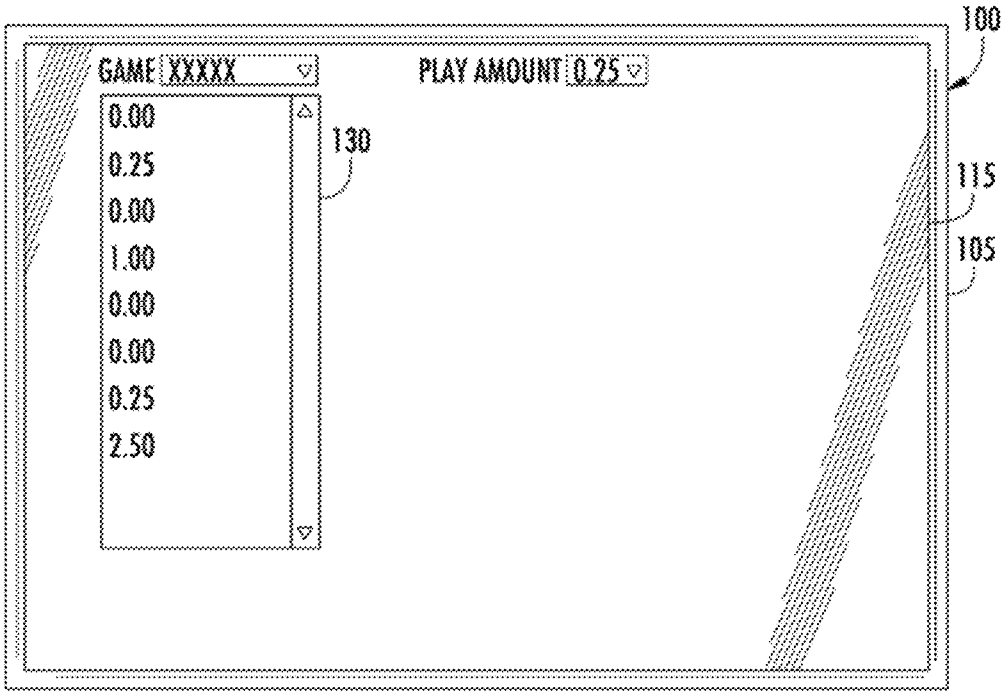
Figure 3B:
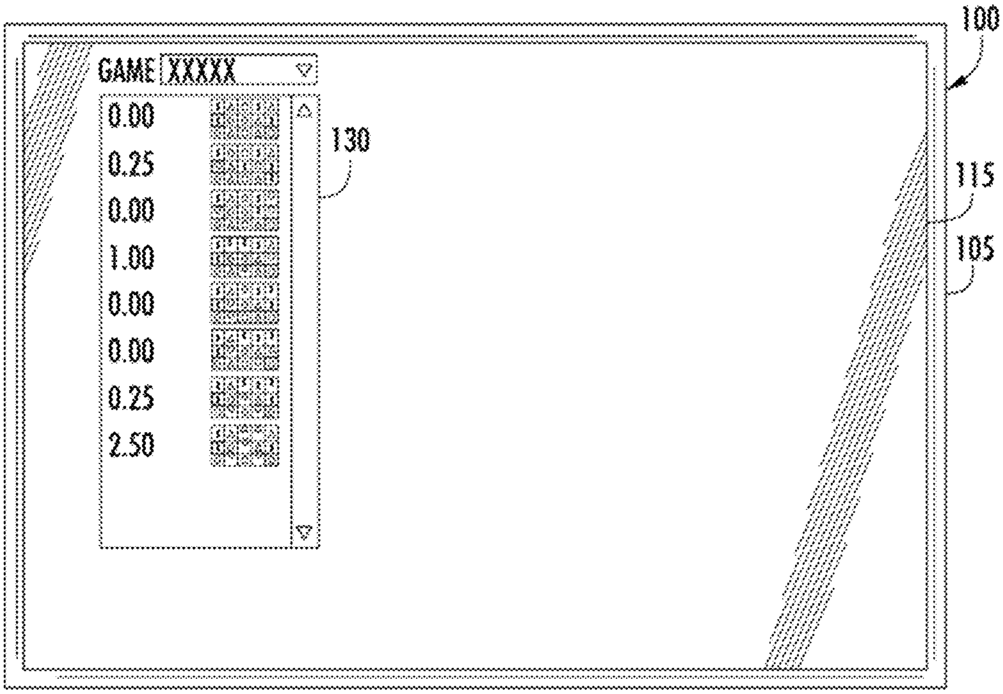
Figure 4A:
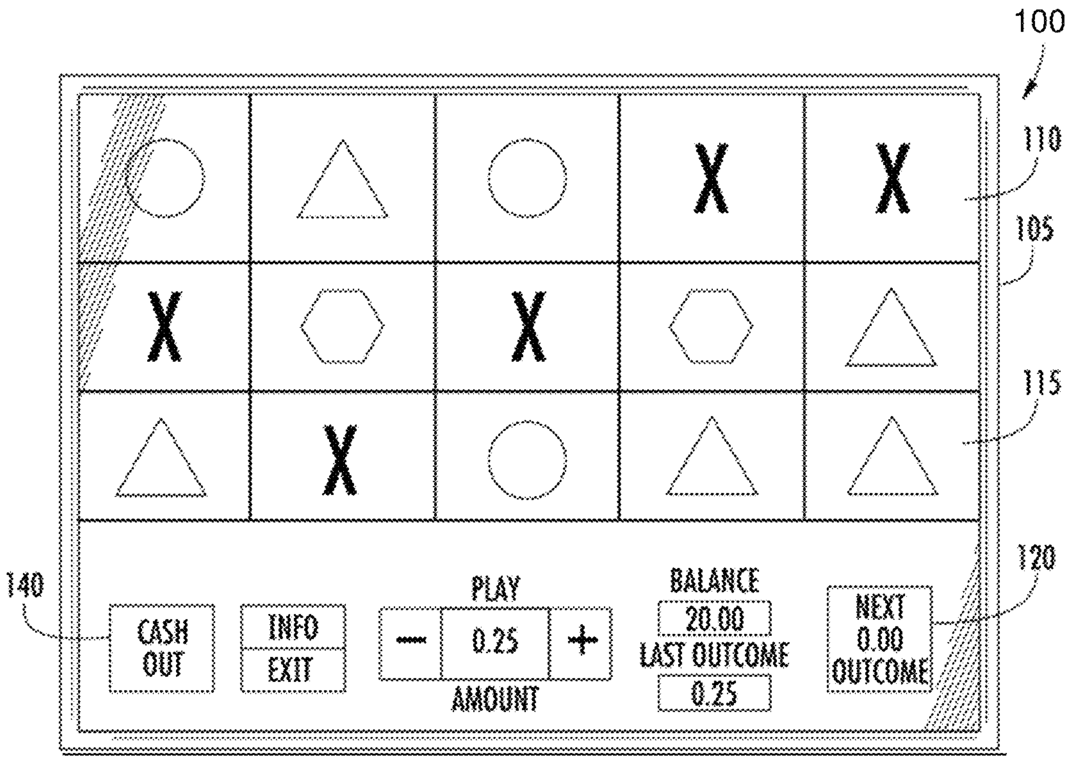
Figure 4B:
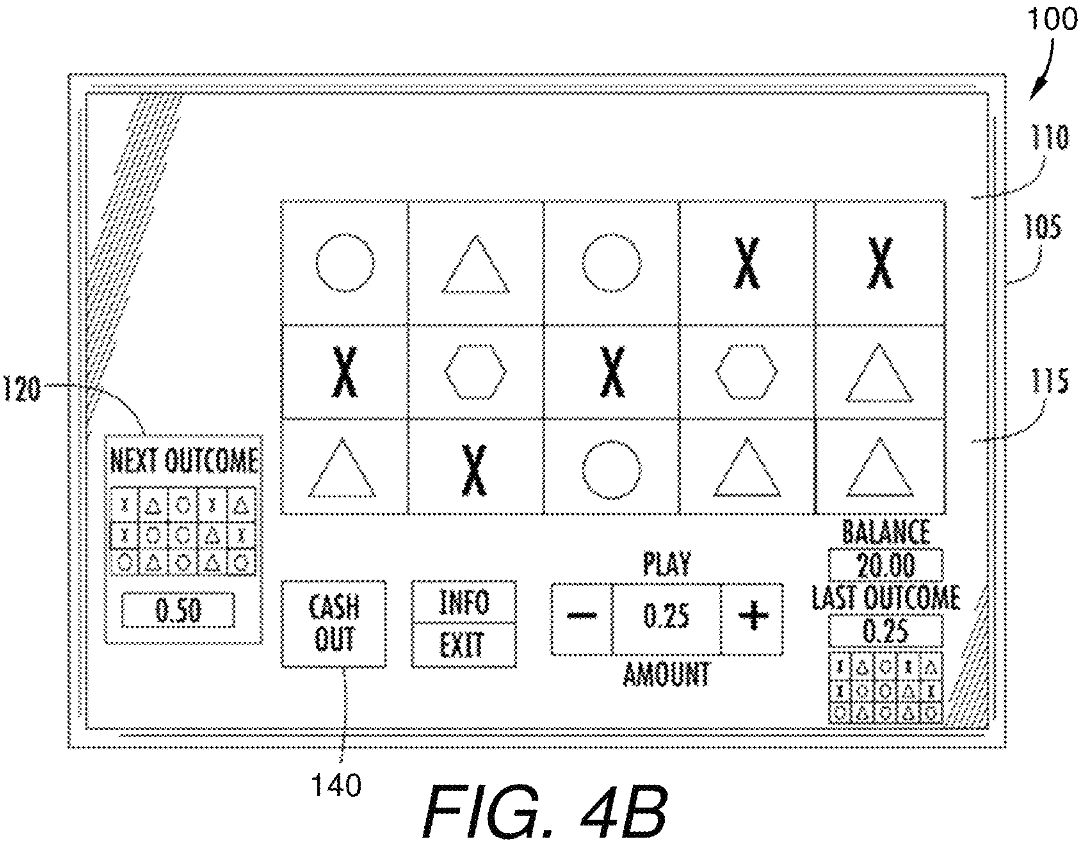
Figure 5:
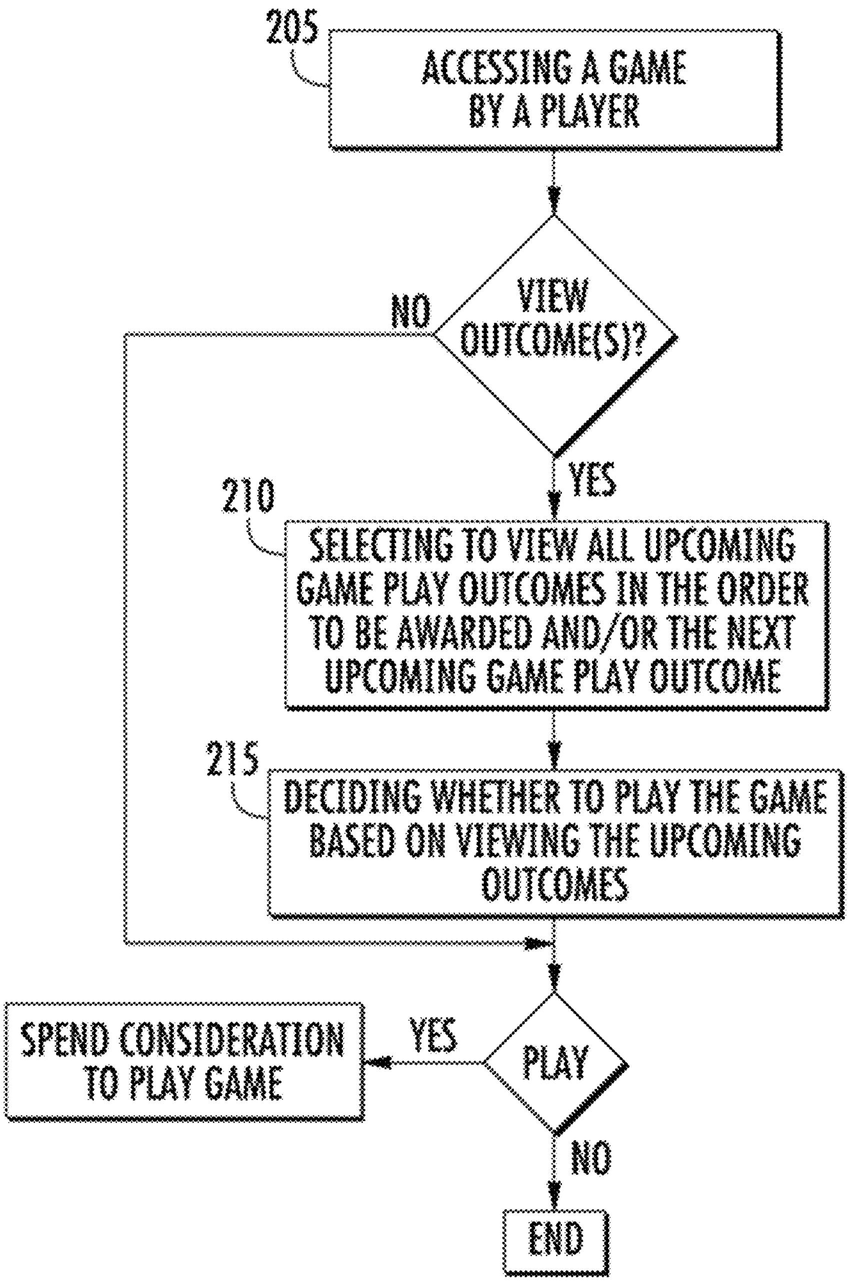
Figure 7:
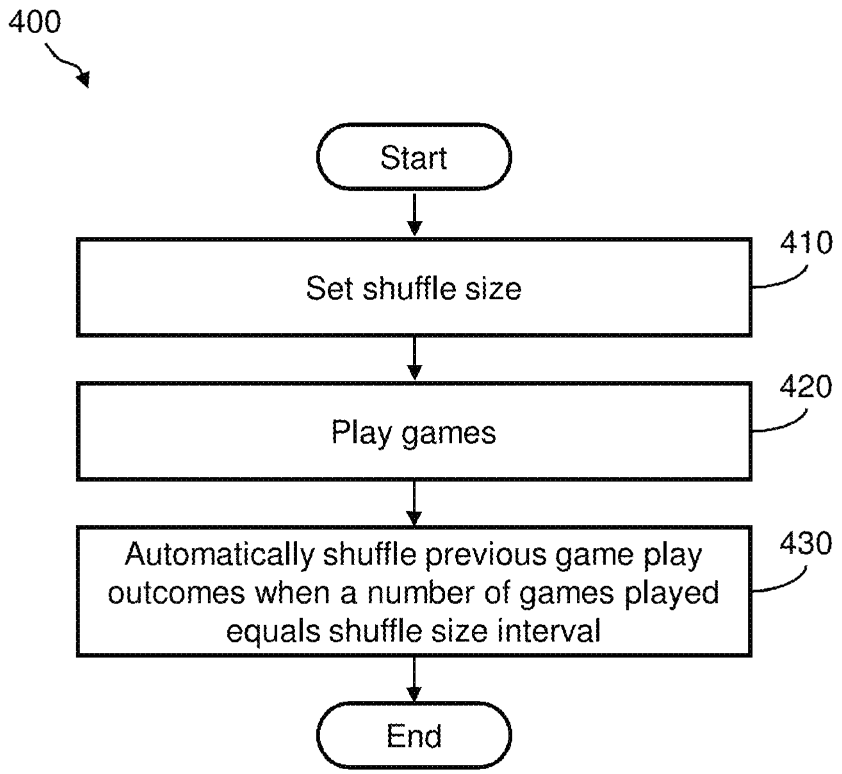

Having thus described the presently disclosed subject matter in general terms, reference will now be made to the accompanying Drawings, which are not necessarily drawn to scale, and wherein:

FIG. 1 illustrates a high-level view of a plurality of electronic game machines networked together in accordance with an embodiment of the invention;

FIG. 2 illustrates a view of a display of a game system in accordance with an embodiment of the invention;

FIG. 3A and FIG. 3B illustrate another view of a display of the game system in accordance with an embodiment of the invention;

FIG. 4A and FIG. 4B illustrate yet another view of a display of the game system in accordance with an embodiment of the invention;

FIG. 5 illustrates a flow chart of a method of playing the game system in accordance with an embodiment of the invention;

FIG. 6 illustrate an example table showing a pool shuffle feature of the game system; and FIG. 7 illustrates a flow chart of an example of a method of using a pool shuffle feature of the game system, in accordance with an embodiment of the invention.

DETAILED DESCRIPTION

In one embodiment a game machine system and method is disclosed that preferably allows a player to view the outcome of all, or a plurality of, upcoming outcomes in the order to be awarded, and/or, the outcome of the next game play, before spending any consideration on the next operation (play) of the game, thereby eliminating any element of chance. The term outcome may include a prize value and/or a board display of the play. Consideration may take a number of forms, including, but not limited to money, tokens, points, chips, tallies, tickets, or the like, whether purchased, earned, or otherwise received in order to use, activate, or play a game.

The game system may include one or more game machines configured to display a game. The game system may further be configured with a finite, preselected list of outcomes (e.g., prize values and/or board displays) for each play, and at each level for multi-level games. Prior to playing a particular game, or game play, on the game machine, a player may view each and every upcoming outcome of a play of the game in the order the outcomes are to be awarded in an “all outcomes” window of the game machine display. To view all the upcoming outcomes to be awarded, the player may, for example, select or activate a “View Outcomes” type button, area of the display, or other similar activation or selection mechanism. Upon selection, the player can view each and every outcome upcoming in the game, in the order to be awarded in the “all outcomes” window of the game machine display, before spending any consideration on a play of the game. The game machine display may also include a next outcome window to show an outcome (e.g., $0.00 or a positive outcome value and/or the final board display) of a next play of the game before any consideration is spent. In one embodiment the game play starts then finishes with a display of the next outcome, e.g., “Next Outcome”, which may be displayed before a player plays the game on the game machine. After a first play, the next outcome may be displayed in the next outcome window e.g., “Next Outcome” window. The player, therefore, can spend consideration on a play of the game only when the player considers the results to be favorable. Every outcome of the game is predictable and viewable to the player before the player plays the game. Alternatively, the player may view a plurality of the upcoming outcomes to be awarded in the order the outcomes will be awarded, for example the player may view more than just the next upcoming game outcome but less than all of the upcoming outcomes of the game.

As opposed to existing games of chance, such as slot machines, and video poker games that charge a player to play for a chance to win more money, tokens, or other item of value based on some element of chance, in the game system of the present invention, a player may play the game and possibly win something of value, but not based on any element of chance. In the present invention the player may view all the upcoming outcomes of the game, and/or, the outcome of the next play, before the player spends any consideration, every time. The game system preferably includes a “Play” button or other similar activation or selection mechanism and also may include a “Next Outcome” window of the display where the next outcome “Next Outcome” is displayed. This “Next Outcome” is exactly what will be awarded on the next play of the game, and may include a view of the next outcome board display. After the player selects the “Play” button, the game will award the “Next Outcome” that was displayed in the “Next Outcome” window, and then the outcome of the next play will appear in the “Next Outcome” window. Additionally, or in the alternative, a player may select or activate a “View Outcomes” button, area of the display, or other similar activation or selection mechanism on the game machine and the player can view each and every upcoming outcome of the game, and for multi-level games for each play level of the game, whether that prize is $0.00 or a positive outcome value, and in the order that the outcomes will be awarded. In the game system, all of the outcomes preferably come from a predetermined, finite list of outcomes. Therefore, the games on the game system do not determine the prize outcome by using an element or instrument of chance, e.g., a random or pseudo-random number generator, or other like element/instrument of chance, but rather the outcomes of the games of the game system are pre-defined in the finite outcome list, which is viewable by the player prior to playing any game on the game system.

As an alternative, or in addition to displaying the view of the upcoming one or more outcomes of a game on a game machine display, the upcoming one or more outcomes may be printed out at the game machine or remote from the game machine, for example, at a remote printer. Further, as an alternative, or in addition to displaying the view of the upcoming one or more outcomes of a game on a game machine display, the upcoming one or more outcomes of a game may be displayed on or by another device other than the game machine. The device may be any of a number of devices, including, but not limited to, computer, smart-phone, pager, personal digital assistant, cellular telephone, monitor (video or otherwise), tablet, pad, or any other device capable of communicating the upcoming one or more outcomes of a game to a player or potential player whether presently in existence or developed in the future. Wherein the device may be local or remote to the game machine and may further be associated with one or multiple game machines. The device may be capable of one, or a combination, of wired or wireless communication. In one example, the upcoming one or more outcomes may be sent as a text, email, or other electronic message type to a player's or potential players' device, such as, a smart-phone, pager, personal digital assistant, cellular telephone, tablet, pad, computer, or the like. In another example, the upcoming one or more outcomes may be accessed via the Internet or an intranet and viewable on a player's or potential players' device, such as, a smart-phone, pager, personal digital assistant, cellular telephone, computer, tablet, pad, or the like. In yet another example, the upcoming one or more outcomes may be displayed on a separate video monitor, associated with a particular game machine or machines. The preceding are only examples, and are non-limiting, other examples are contemplated within the scope of the invention.

In one example, a player may insert twenty dollars ($20) into a game machine of the game system. The player may view the actual list of outcomes showing all the outcomes to be awarded in the order to be awarded for each play of the game and then decide which play level (if a multi-level game) the player wants to select before committing some, or all of the player's $20 to the game. If after inserting the $20 the player then decides they do not wish to play the game for any of the displayed outcomes that are listed to be awarded, the player can select or activate a "Cash Out" button, area of the display, or other similar activation or selection mechanism on the game machine, for the player to cash out and get the $20 back. In one example, the "Cash Out" button causes the game machine to dispense a redemption ticket, which the player redeems for a value listed on the redemption ticket, e.g., $20. Alternatively, in the above example the play may elect to view the actual list of outcomes showing all the outcomes to be awarded in the order to be awarded for each play of the game and then insert $20 into the game machine of the game system.

Therefore, there is no element of chance present in the game system of the present invention. While in some embodiments the games of the game system may have the look and feel of traditional slot machines, video poker machines, and other similar gaming devices, e.g., display spins in an entertaining fashion like a slot game, however, chance has no role in the outcome of play. Each and every outcome that a player could win may be viewed by that player before spending any consideration. As a result, every single outcome of the games of the game system is entirely predictable by the player.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof.

The invention provides an electronic game system and method with no element of chance that allows a player to view one or more upcoming outcomes of a game play, and preferably all upcoming outcomes of game play and/or the outcome of the play of the next game, before spending any consideration on the next operation (e.g., play) of the game. Wherein, consideration may take a number of forms, including, but not limited to money, tokens, points, chips, tallies, tickets, or the like, whether purchased, earned, or otherwise received in order to use, activate, or play a game.

Referring to the drawings, FIG. 1 through FIG. 4B illustrate a game system 100. The game system 100 may include one or more game machines 105 configured to display a game 110 on game display 115. The game machine 105 may be also configured to display, or have displayed, a view of all the outcomes of the upcoming game plays in the order they are to be awarded and/or to display the very next upcoming game play outcome. Upon a selection by a player, for example using a "View Outcomes" button 125, area of the display, or other similar activation or selection mechanism on game machine 105 a player may view a list of all the outcomes of the upcoming game plays in the order to be awarded in an all outcomes window 130 on game display 115. The very next upcoming game play outcome may be displayed in a next outcome window 120 (e.g., "Next Outcome") on game display 115. The displayed outcome(s) of the upcoming game play(s) may include the outcome value (e.g., 0.00, 0.25, etc.) and/or a board display of the outcome, where the board display may be a graphical representation of the outcome of the game play, e.g., the final reel position in a slots style game.

Game machine 105 may be any device capable of allowing a player to play a game, or games, and may also be capable of dispensing awards, monetary or otherwise, as appropriate. Game machine 105 may be a stand-alone unit capable of operating play on its own or, may be part of a network 10 that has a plurality of networked game machines 105.

With reference to FIG. 1, a network 10 for providing a networked electronic game system 100 according to one embodiment of the present invention is illustrated. Network 10 may include one or more game machines 105, networked together via a communication link 15 at a particular location, for example, a single site indicated by box 20, or across multiple locations, e.g., multiple sites 20. In addition, each game machine 105 may be networked via communication link 15 to one or more system manager computers 25. The system manager computer 25 may be located at site 20, or alternatively may be remote from site 20. System manager computer 25 may be networked via a communication link 30 to one or more remote data center computers 35.

It will be appreciated that data communication between components of network 10 may be adapted to send and receive data via wired, wireless transmissions, using any suitable wireless connection, or a combination of wired and wireless transmissions.

Communication links 15 and 30 may comprise modems, telephone lines, the Internet, intranet, satellites, wireless connections, or the like, whether currently known or in the future, and any combination thereof for sending and receiving data and signals. Communication links 15 and 30 preferably provide a fast, efficient, reliable, and secure means for transferring digital data between components of network 10.

System manager computer 25, in one embodiment, preferably provides a hub for game machines 105 and performs various other site-related functions. For example, system manager computer 25, may maintain and provide accounting information for site 20, contain information related to game system 100, and/or transmit game information (updates, new games, fixes, and the like) to the game machines 105.

In an embodiment, selected data may be periodically transferred back and forth between system manager computer 25 and data center computer 35. For example, the type and amount of accumulated transactions may be reported by each system manager computer 25 to data center computer 35 on a regular basis, such as hourly, daily, weekly, etc. Game machines 105 may communicate directly with system manager computer 25 and/or data center computer 35.

Data center computer 35 may store, track, and maintain game outcome tables for all games currently being played. In one embodiment data center computer 35, or alternatively system manager computer 25, may also store all game software, information, and instruction, and game machines 105 may function primarily as a means of accepting the game information and instruction, displaying the game to the player for play, for example, although the player enters a game selections and plays the game from game machine

105, the actual functionality of the game may be performed remotely by data center computer 35, or alternatively system manager computer 25.

It will be appreciated that in alternate embodiments the functions and operations of system manager computer 25 and data center computer 35 may be combined in different configurations into one or more computers or stations located either at site 20 or remote from site 20. System manager computer 25 and data center computer 35 may be any standard computer for example, be a general-purpose computer, special purpose computer, personal computer, or other programmable data processing apparatus. System manager computer 25 and data center computer 35 may serve to provide processing capabilities, such as storing, interpreting, and/or executing software instructions, as well as controlling the overall operation of the system. System manager computer 25 and data center computer 35 may be configured and programmed to control data and/or power aspects of these devices.

In one embodiment of the invention, game machine 105 may be, for example, a five reel slot machine style game as shown in FIG. 4A and FIG. 4B. However, the invention is not limited to only slot machine style games. Various embodiments of the invention can be used to illustrate view play of any game capable of being played on an electronic gaming machine. For example, the game machine 105 may be configured to play games, including, but not limited to, slots, video poker, keno, black jack, and the like. Additionally, lottery tickets or pull-tabs are also within the scope of the present invention. For example, lottery tickets or pull-tabs can be displayed through a window (e.g., a pull-tab dispenser), printed out or dispensed, or depicted electronically on display 115 and the player may view the outcome before it is dispensed.

In game system 100 of the present invention, prior to playing a particular game 110 on game machine 105, or spending any consideration, a player may view a plurality of outcomes to be awarded by the game 110 in the order they will be awarded, and preferably a list of all outcomes to be awarded by the game 110 in the order they will be awarded from a finite preselected list of game outcomes 37 for each play. To view all the outcomes to be awarded, the player may, for example, select or activate a "View Outcomes" type button 125, area of the display, or other similar activation or selection mechanism. Upon selection of the "View Outcomes" type button 125, the player can view a list of each and every one of the upcoming outcomes that will be awarded by the game, in the order to be awarded, before spending any consideration on a play of the game. The list of all upcoming outcomes may be viewed in an all outcomes window 130 on game display 115.

Additionally, the game play may start, and finish, with the next upcoming game play outcome displayed for the player to view prior to the next play. The next outcome window 120 displays the outcome of the next game play before consideration is spent by the player. The player may therefore view the outcome of the next game play before spending any consideration. The outcomes or outcome displayed may include the outcome value (e.g., 0.00, 0.25, etc.), and/or a board display of the outcome, where the board display may be a graphical representation of the game play, e.g., the final reel position in a slots style game. The player can, thus, spend money on a result, or results that is already known to the player.

As an alternative, or in addition to viewing the upcoming one or more outcomes of game(s) 110 on a game machine display 115, the upcoming one or more outcomes may be printed out at game machine 105 or remote from game machine 105, for example, at a remote printer. Further, as an alternative, or in addition to displaying the view of the upcoming one or more outcomes of game(s) 110 on a game machine display 105, the upcoming one or more outcomes of game(s) 110 may be displayed on or by another device other than game machine 105. The device may be any of a number of devices, including, but not limited to, computer, smart-phone, pager, personal digital assistant, cellular telephone, monitor (video or otherwise), tablet, pad, or any other device capable of communicating the upcoming one or more outcomes of game(s) 110 to a player or potential player. Wherein the device may be local or remote to game machine 105 and may further be associated with one or multiple game machines 105 and/or network 10. In one example, the upcoming one or more outcomes of game(s) 110 may be sent as a text, email, instant message, or other electronic message type to a player's or potential players' device, such as, a smart-phone, pager, personal digital assistant, cellular telephone, computer, tablet, pad, or the like. In another example, the upcoming one or more outcomes of game(s) 110 may be accessed via the Internet or an intranet and viewable on a player's or potential players' device, such as, a smart-phone, pager, personal digital assistant, cellular telephone, computer, tablet, pad, or the like.

In yet another example, the upcoming one or more outcomes of game(s) 110 may be displayed on a separate video monitor, associated with a particular game machine or machines 105. The preceding are only examples, and are non-limiting, other examples are contemplated within the scope of the invention.

After the player has selected and spent consideration on one or more of the outcomes, preferably a visible process, such a spinning of reels or turning of cards, ending in the exact same outcome as previously shown, is presented to the player on game display 115. Alternatively, if the player does not want to accept the known outcome they can elect to not play, or if the player has already deposited some amount of consideration press a "Cash Out" button 140, area of the display, or other similar activation or selection mechanism on the game machine 105 and get their deposited consideration back, without any charge for playing.

Further, each of the game machines 105 of game system 100 may include a game play outcome pool shuffle feature (referred to herein as pool shuffle feature 42). More details of the pool shuffle feature 42 are shown and described below with reference to FIG. 6 and FIG. 7.

Game system 100 may include one or more games 110 with one or more levels of play per game play. For example, game system 100 may include four or more levels of play, or alternatively less than 4 levels of play.

Game system 100 may also include a software component. The software component may be part of, or added to an existing software program of the game machine 105. The software component may be programmed or otherwise embedded into a readable storage medium and may be on a printed circuit board, or the like, which may then be connected to game machine(s) 105, e.g., to existing display monitor, control buttons, and any other necessary game components. In an embodiment where the software component is added to an existing software program of the game machine 105, after the addition of the software component into the existing software program, a game operator or owner may customize the next outcome window 120, for example, as a small preview window that shows the next outcome, or the operator can have a button (not shown) that the player may push and view the outcome of the upcoming game play (or plays). The game operator or owner may also customize the all outcomes window 130, for example, as a small preview window that shows the list of outcomes, or the operator may have a button, such as "View Outcomes" type button 125 that the player may push and view all the outcomes of the upcoming game plays. Alternatively, the existing software program and/or the software component may be loaded on remote system manager computer 25 and/or a remote centralized data center computer 35.

The software component may include one or more of the following instructions: generation of an on screen display that may include a game title, a set of instructions, game graphics, and/or an outcome table, list and/or display; reception of a player's commands through game machine 105 hardware; accessing a database, e.g., database 38, of predetermined graphics, symbols, tables and/or values, to create the game display and all outcomes window 130 and/or next outcome window 120; accessing an outcome table, which is saved in a game memory storage medium, having a finite preselected list of game outcomes 37 for each level game play to generate either, or both of a list of all the outcomes for each upcoming game play in the order to be awarded and/or the outcome for the next game play. The list of all the outcomes for each level of game play listed in the order to be awarded may be revealed upon activation by the player, whereby the game display 115 will display, or game machine 105 will cause to be displayed, a listing of all the upcoming outcomes for each level of game play in the order to be awarded in, for example, all outcomes window 130. The outcome for the next game play may be revealed upon the conclusion of a previous game play, or by activation of the game by the player, whereby the game display 115 will display, or game machine 105 will cause to be displayed, the outcome for the next game play in, for example, next outcome window 120. The software component may further include instructions, such as, initiating the game upon selection of the selected game play and displaying the next outcome, whereby the next available outcome according to the outcome table is awarded; and tracking and recording game play data and accounting such as number of plays, credits in/out, and the like.

FIG. 5 shows an exemplary method 200 for allowing a potential player to view an outcome and/or all outcomes of a game prior to spending consideration. The method may include one or more of the following steps:

Step 205, accessing a game 110 on game machine 105 by a player, the game machine 105 configured for the player to be able to view a complete list of all the upcoming outcomes of game play in the order to be awarded and/or being configured for the player to be able to view the next outcome for the next game play. Alternatively, game machine 105 may be configured for the player to be able to view a partial list of the upcoming outcomes for game 110 in the order to be awarded.

Step 210, the player may then select to view a complete list of all the upcoming outcomes of game play in the order to be awarded. The player may also, or in the alternatively, select to view next outcome window 120, for example, to view the next outcome for the upcoming game play.

Step 215, the player may then decide whether or not to play, and then if the player decides to play selects to play. In the event there are multiple play levels the player may select what level, or levels, to play. Alternatively, the player may choose to play the game prior to Step 210.

The player may insert consideration prior to viewing the complete list of all the upcoming outcomes of game play in the order to be awarded and/or the outcome of the next game play. For example, the player upon accessing game 110 on gaming machine 105, may insert some amount of consideration, and then select to view the complete list of all the upcoming outcomes of game play in the order to be awarded and/or the outcome of the next game play. If the player, after viewing all the outcomes and/or the next outcome, decides to not continue, the player can choose to "cash out" and have the deposited consideration returned. Alternatively, the player may select to view the complete list of all the upcoming outcomes of game play in the order to be awarded and/or the outcome of the next game play and then insert some amount of consideration into gaming machine 105. In yet another alternative, the player may choose to deposit consideration with the game machine 105 and play game 110 prior to viewing the complete list of all the upcoming outcomes of game play in the order to be awarded and/or the outcome of the next game play.

After viewing the outcome for all the upcoming outcomes of game play in the order to be awarded and/or for the next play, the player now knows the exact outcome of the game play prior to spending any consideration. The player then may choose if they wish to participate or not, knowing the exact outcome should they choose to play. If the player chooses to play, consideration is deducted from the consideration they have previously deposit, or alternatively, if the player has not yet deposited any consideration then they are prompted to do so. The player then selects to play and plays the game. However, if the player chooses not to play, the player can select not to do so and receive a refund of their deposit back (provided the player had previously deposited consideration prior to playing), with no purchase necessary.

The method 200 may include software that uses a database 38 including a finite preselected list of game outcomes 37 of all the game plays to generate either, or both of, a list of all the upcoming outcomes of game play in the order to be awarded and/or the outcome for the next game play to determine the final outcome depending on the game type, for game machine 105 to display prior to the player spending consideration to play the upcoming game.

Game system 100 may further include a game outcome pool shuffle feature 42 for automatically shuffling the listed order of a certain number of game play outcomes 37 of previously played game plays at certain interval(s) of game play. For example, FIG. 6 shows table 300, which is a non-limiting example of outcomes representing a certain pool of game outcomes 37 to which the pool shuffle feature 42 has been applied.

In one example, game 110 of game system 100 may have a base pool of some finite number of predetermined game play outcomes 37 (game play outcome pool). In operation, after a predetermined number of game plays of the game 110 the pool shuffle feature 42 would be triggered and would automatically shuffle the order of a certain number of the previously played game play outcomes. The base pool size of the game play outcomes for a particular game 110 may be referred to as the game play outcome pool size. The number of previous played game play outcomes that get shuffled by the pool shuffle feature 42 at the predetermined interval(s) may be referred to as the shuffle size.

Generally, the finite preselected list of game outcomes 37 for a particular game 110 on a game machine 105 may have a game play outcome pool size of some finite number of game play outcomes 37, i.e., its game play outcome pool size. In a non-limiting example, for a particular game 110 on game machine 105, it may include a game play outcome pool size in the range of about 60,000 (60k) to about 100,000

(100k) game outcomes 37. However, the game play outcome pool size is not limited to being in the range of about 60,000 (60k) to about 100,000 (100k) game play outcomes 37, but may include any number of game outcomes 37, which may be less than 60k or may be more than 100k.

With respect to pool shuffle feature 42 of game system 100, "shuffle size" may mean a set number of previously played game play outcomes 37 to be shuffled. In one example, for a game 110 having a game play outcome pool size in the range of about 60k to about 100k game outcomes 37, the shuffle size may be, in one non-limiting example, about 5,000 (5k). However, the shuffle size may be any subset of the total number of game outcomes 37 in the game play outcome pool for a particular game 110, and may depend on the overall size of the game play outcome pool of the particular game 110.

In one embodiment, for pool shuffle feature 42 of game system 100, prior to the first use in the field (first commercial use) for a particular game 110 and/or each game machine 105, the initial order of the game outcomes 37 in the game play outcome pool for a particular game 110 may be shuffled independently from the particular game 110 on other game machines 105, so while the values of the game outcomes 37 are the same, the order may be different from one game machine 105 to another. For a certain game play outcome pool size, it may be beneficial to set a shuffle size that is a large enough number to substantially prevent cheating but still small enough to ensure that the game play feel is substantially unaffected, for example, in a game play outcome pool size including in the range of about 60k-100k game outcomes 37, an example shuffle size may be about 5k. However, the shuffle size may be less than or greater than 5k.

Once a game machine 105 is in the field (out in commercial use), pool shuffle feature 42 of game system 100 may automatically shuffle the order of a certain number of previously played game outcomes 37 of the game play outcome pool at predetermined interval(s) of game play.

For ease of illustration purposes only, table 300 shows a comparatively small example of a game play outcome pool size including twenty-five (25) outcomes representing game outcomes 37. In this example, for table 300, a shuffle size of 5 is used for exemplary purposes. In table 300, each GAME NUMBER has an INITIAL POOL outcome value (e.g., 0, 1, 2, 3, 4). Then, for a shuffle size of 5, outcome values (multipliers) may be taken in groups of 5 (shuffle size) in order starting with GAME NUMBER 1 and randomly order (shuffle) the outcome values within their group of 5. In this example, the shuffle may be triggered after every 5th play (or at the play of play 6), so at play 6, then at play 11, then at play 16, and then at play 21. For the sake of ease of illustration purposes, Table 300 shows the shuffle order AFTER 6 PLAYS and then AFTER 11 PLAYS only. It being understood that this pattern would repeat itself as additional game plays are played. In this example, table 300 shows a group 302 in the AFTER 6 PLAYS column. In group 302, the outcome values (or multipliers) for the GAME NUMBERS 1 through 5 are always the same, just in a different order. This may be done for each denomination (not shown) for the game. For example, once this is done, each game may have a unique game outcome pool for the 0.25, 0.5, 0.75, $1, etc. denominations. The same pool, just a different order. They keep this order until a shuffle is triggered by pool shuffle feature 42. Further to the example, table 300 shows a group 304 in the AFTER 11 PLAYS column. In group 304, the outcome values (or multipliers) for game play outcomes GAME NUMBERS 6 through 10 are the same, but just in a different order, that is they have been shuffled.

In one embodiment, a player after playing, for example, GAME NUMBER 8 would be able to view all the listed game outcomes 37 of the game play outcome pool for the particular game 110 being played, through GAME NUMBER 5, that is the player could view the upcoming game outcomes 37 of the game play outcome pool for GAME NUMBERS 9-25 and for the played GAME NUMBERS 1-5. In one example, only the game outcomes 37 of the game play outcome pool for the played games in their current section would not be viewable, i.e., in the above example GAME NUMBERS 6-8. However, once the player entered the next section (shuffle size) of game plays, e.g., GAME NUMBERS 11-15, the player would also then be able to view the listed game outcomes 37 of the game play outcome pool through the player's lasted completed section of games, e.g., including GAME NUMBERS 6-10.

Continuing the example of table 300, with the example of a game outcome pool size of twenty-five and a shuffle size of 5, a player may start playing a game 110 on a game machine 105 at, for example, GAME NUMBER 1 for $1 (for ease of illustration). The player plays 5 times, which means the last game played was GAME NUMBER 5. For the shuffle size of 5, at the conclusion of play 5 or when the player clicks play for the 6th game play, the pool shuffle feature 42 is automatically initiated/triggered to shuffle the order of the previous 5 listed game play outcomes 37, i.e., for GAME NUMBERS 1-5.

In one example, to shuffle the previously played game play outcomes for GAME NUMBERS 1-5, their game play outcomes may be set to a zero multiplier, and the winners from the group may be assigned randomly to the game play outcomes for GAME NUMBERS 1-5. It is possible for a game play outcome to get the same multiplier and/or value as it had before.

As play continues, the next shuffle point would be game play outcome GAME NUMBER 11. Upon the conclusion of the GAME NUMBER 11 game play or when the player clicks to play GAME NUMBER 11, the pool shuffle feature 42 of the game system 100 automatically shuffles the order of the game play outcomes 37 for the previously played GAME NUMBERS 6-10. Here, the previously shuffled order of game play outcomes for GAME NUMBERS 1-5 are not affected by this shuffle. The order of game play outcomes of GAME NUMBERS 1-5 remain in the order they were when they were shuffled previously.

Again, table 300 shows the INITIAL POOL column, which is the initial order of the listed game play outcomes 37 prior to a first game play of game 110. The AFTER 6 PLAYS column shows the game play outcomes of played GAME NUMBERS 1-5 are shuffled upon the conclusion of the GAME NUMBER 5 game play or when the player clicks to play playing GAME NUMBER 6. The AFTER 11 PLAYS shows the game play outcomes of played GAME NUMBERS 6-10 are shuffled upon the conclusion of the GAME NUMBER 10 game play or when the player clicks to play playing GAME NUMBER 11, and only the order of the game play outcomes for played GAME NUMBERS 6-10 in the AFTER 11 PLAYS column are shuffled, the order of the game play outcomes of played GAME NUMBERS 1-5 remain the same as shown in the AFTER 6 PLAYS column, and the game play outcomes GAME NUMBERS 11 through 25 are still the same as they have not been played yet and/or the shuffle triggering event has not yet occurred for their applicable shuffle group (for example, all the number of plays in their shuffle size have not been played yet).

In game system 100, pool shuffle feature 42 may provide a number of benefits and improvements in the technological area of electronic gaming/gaming machines and systems by helping to prevent cheating, for example by making it such that a player cannot pinpoint where a certain game machine 105 may be in its list of game play outcomes 37 for a particular game 110. That is with the pool shuffle feature 42, a player may not be able to play a particular game 110 on a first game machine 105 and record the listed outcomes, and then go to another machine 105 with the same game 110 and play some number of plays to determine where in the outcome list that game machine is at, and therefore be able to pinpoint the next big outcome is. For example, if the next large outcome is close, e.g., only a few plays away, the player may play the next few plays to win the outcome, or if the player figures out the next big outcome is several plays away (e.g., 1,000 plays), the player may just come back later when it is closer to the big outcome, and thereby manipulating/gaming the system to unfairly collect the larger outcomes. The pool shuffle feature 42 may prevent this by constantly shuffling the order of the outcomes of previously played game plays at set intervals, so a player cannot go from one game machine 105 to another and pinpoint where in the outcome list that particular game is.

In one embodiment, upon "initializing" a certain game machine 105, i.e., before it is put in the field (out in commercial use), its game play outcome pool of game play outcomes 37 for a game 110 may be shuffled so each game machine 105, which may all have the same outcome values, may have them in a different order, so the order of game outcomes for a particular game 110 from one game machine 105 to another may be different. In another example, once a game machine 105 is in the field, the pool shuffle feature 42 may be used to continuously shuffle the listed order of previously played game play outcomes 37 of the game play outcome pool at certain intervals of game plays, i.e., based on a certain number of game plays played (shuffle size). For example, using the previously used example of a shuffle size of 5000, the listed outcomes of game play outcomes 37 may be shuffled in batches of 5000, e.g., after 5,000 game plays the listed order of the outcomes of the immediate previously played 5,000 game plays may be shuffled. The shuffle size may be set based on the game outcome pool size of a particular game 110, such that a player cannot pinpoint where a certain game machine 105 is in its list of game play outcomes 37 for the game 110.

Further in game system 100, the pool shuffle feature 42 is based simply on the overall games played of a game 110 on the certain game machine 105, not based on games played by one certain player on the certain game machine 105. That is the pool shuffle feature 42 does not reset the listed order of game play outcomes 37 to its initial order for each player, rather it continues to run at the set intervals from player to player.

FIG. 7 illustrates a flow chart of an example of a method 400 of using a pool shuffle feature 42 of game system 100, in accordance with an example embodiment of the invention. Generally, with respect to the pool shuffle feature 42 of game system 100, in method 400, a controller local to a certain game machine 105, the one or more system manager computers 25, or remote may be programmed to automatically shuffle the listed order of a predetermined number of previously played game play outcomes at certain intervals (i.e., every certain number of game plays), where the predetermined number of outcomes of the previous games played is a subset of the overall number of listed game play outcomes. Method 400 may include, but is not limited to, the following steps.

At a step 410, the shuffle size may be set. The shuffle size may be set to some sub-set of the total number of the listed game outcomes 37 for a particular game 110 of a game machine 105. In one non-limiting example, for a particular game 110 having in the range of about 60k to about 100k listed game outcomes 37, the shuffle size may be set to 5k, meaning that after every 5k game plays, the order of the immediately preceding **5*k*** game play outcomes is shuffled.

At a step 420, games are played. For example, a player initiates game play of a game 110 on a game machine 105 of game system 100.

At a step 430, at set intervals of game play, i.e., after/at a set number of game plays are played, a certain number of previous game play outcomes of the game play outcome pool, equal to the shuffle size, are automatically shuffled. In one example, for a particular game 110 having, for example, a game play outcome pool size in the range of about 60k to about 100k game play outcomes 37 and a set shuffle size of 5k, for example, after/at each interval of 5k game plays, the order of the listed game play outcomes 37 of the 5k immediately preceding played game plays may be automatically shuffled. Wherein, only the number of game outcomes 37 equal to the shuffle size are shuffled at each shuffle interval.

It will be appreciated that the example quantities of various aspects of the invention, including but not limited to game play outcome pool size, shuffle size, etc., are exemplary only and the actual values may be less than or greater than the amounts used in the examples.

It will be appreciated that various aspects of the invention may be embodied as a method, system, computer readable medium, and/or computer program product. Aspects of the invention may take the form of hardware embodiments, software embodiments (including firmware, resident software, micro-code, etc.), or embodiments combining software and hardware aspects that may all generally be referred to herein as a "circuit," "module" or "system." Furthermore, the methods of the invention may take the form of a computer program product on a computer-usable storage medium having computer-usable program code embodied in the medium.

Any suitable computer useable medium may be utilized for software aspects of the invention. The computer-usable or computer-readable medium may be, for example but not limited to, an electronic, magnetic, optical, electromagnetic, infrared, or semiconductor system, apparatus, device, or propagation medium. The computer readable medium may include transitory and/or non-transitory embodiments. More specific examples (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Program code for carrying out operations of the invention may be written in an object oriented programming language such as Java, Smalltalk, C++ or the like. However, the program code for carrying out operations of the invention may also be written in conventional procedural programming languages, such as the "C" programming language or similar programming languages. The program code may be executed by a processor, application specific integrated circuit (ASIC), or other component that executes the program code. The program code may be simply referred to as a software application that is stored in memory (such as the computer readable medium discussed above). The program code may cause the processor (or any processor-controlled device) to produce a graphical user interface ("GUI"). The graphical user interface may be visually produced on a display device, yet the graphical user interface may also have audible features. The program code, however, may operate in any processor-controlled device, such as a computer, server, personal digital assistant, phone, television, or any processor-controlled device utilizing the processor and/or a digital signal processor.

The program code may locally and/or remotely execute. The program code, for example, may be entirely or partially stored in local memory of the processor-controlled device. The program code, however, may also be at least partially remotely stored, accessed, and downloaded to the processor-controlled device. A user's computer, for example, may entirely execute the program code or only partly execute the program code. The program code may be a stand-alone software package that is at least partly on the user's computer and/or partly executed on a remote computer or entirely on a remote computer or server. In the latter scenario, the remote computer may be connected to the user's computer through a communications network.

The invention may be applied regardless of networking environment. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may include coaxial cables, copper wires, fiber optic lines, and/or hybrid-coaxial lines. The communications network may even include wireless portions utilizing any portion of the electromagnetic spectrum and any signaling standard (such as the IEEE 802 family of standards, GSM/CDMA/TDMA or any cellular standard, and/or the ISM band). The communications network may even include powerline portions, in which signals are communicated via electrical wiring. The invention may be applied to any wireless/wireline communications network, regardless of physical componentry, physical configuration, or communications standard(s).

Certain aspects of invention are described with reference to various methods and method steps. It will be understood that each method step may be implemented by the program code and/or by machine instructions. The program code and/or the machine instructions may create means for implementing the functions/acts specified in the methods.

The program code may also be stored in a computer-readable memory that can direct the processor, computer, or other programmable data processing apparatus to function in a particular manner, such that the program code stored in the computer-readable memory produce or transform an article of manufacture including instruction means which implement various aspects of the method steps.

The program code may also be loaded onto a computer or other programmable data processing apparatus to cause a series of operational steps to be performed to produce a processor/computer implemented process such that the program code provides steps for implementing various functions/acts specified in the methods of the invention.

Although the foregoing subject matter has been described in some detail by way of illustration and example for purposes of clarity of understanding, it will be understood by those skilled in the art that certain changes and modifications can be practiced within the scope of the description herein.

Following long-standing patent law convention, the terms "a," "an," and "the" refer to "one or more" when used in this application. Thus, for example, reference to "a subject" includes a plurality of subjects, unless the context clearly is to the contrary (e.g., a plurality of subjects), and so forth.

Throughout this specification, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

What is claimed is:

1. A computer-implemented gaming method comprising:

one or more game machines interacting with a user to play one or more games under control of a gaming system, wherein interacting comprises, the user accessing one of the one or more games;

presenting the user with an option to view outcomes of a chosen game, wherein outcomes include outcomes in an order to be awarded and a next upcoming game play outcome;

receiving the user choice, wherein the user choice comprises one or more of viewing outcomes in an order to be awarded and viewing a next upcoming game play outcome;

if the user chooses to play the game, presenting the user with an opportunity to spend consideration to play the chosen game;

if the user chooses to spend consideration to play the game, the user is awarded a next outcome that was displayed to the user in a next outcome window, wherein an outcome of a next play will then appear in the next outcome window;

receiving a user choice to view outcomes, wherein the user is presented with each and every outcome of the game and an order in which any outcomes will be rewarded, wherein any outcomes are generated by the game system which stores them as a pre-define and finite list that is viewable by a user prior to playing a game on the gaming system;

executing a pool shuffle feature that automatically shuffles a listed order of a certain number of game outcomes of previously played games at certain intervals of game play, wherein a base pool size of game play outcomes for a particular game may be referred to as the game play outcome pool, and a number of previously played game play outcomes that are shuffled by the pool shuffle feature may be referred to as the shuffle size; and a game play outcome pool size includes at least 60,000 game outcomes, and a shuffle size is any subset of a total number of game outcomes in the game play outcome pool;

wherein executing the pool shuffle feature comprises, setting a shuffle size; and after one or more games are played by a user, previous game play outcomes are automatically shuffled when a number of games plays equals the shuffle size.

2. The method of claim 1, further comprising:

upon selection by the user to play the game, automatically querying an outcome table stored on a database of the gaming system for a game outcome next in sequential order;

displaying for the user a game result graphic that coincides with the game outcome next in sequential order;

at set intervals, automatically shuffling an order of a predetermined number of outcomes of previous game plays;

prior to game play, enabling the user to view a full outcome table comprising each and every outcome for all upcoming game plays of the game in full and in the order to be awarded; and receiving an input from the user that indicates the user's desire to play or not play the game.

3. The method of claim 2, further comprising:

after receiving the user's selection to play the game, receiving an indication of a consideration deposit that represents the user's payment.

4. The method of claim 3, further comprising returning the consideration deposit in the event the player decides not to play based on viewing a complete list of all upcoming game outcomes prior to play.

5. The method of claim 1, wherein a game comprises selected one or more levels of play.

6. The method of claim 5, further comprising authorizing a deduction from a consideration deposit corresponding to the selected one or more levels of play.

7. The method of claim 6, further comprising facilitating a refund of the consideration deposit if none of the one or more levels of play are selected.

* * * * *